United States Patent [19]

Hartley

[11] Patent Number: 5,189,724
[45] Date of Patent: Feb. 23, 1993

[54] ARRANGEMENT FOR ACCOMMODATING EXCESS LENGTH OF OPTICAL FIBERS

[75] Inventor: James T. Hartley, Tustin, Calif.

[73] Assignee: Hughes Aircraft Company, Los Angeles, Calif.

[21] Appl. No.: 840,226

[22] Filed: Feb. 24, 1992

[51] Int. Cl.[5] ............................................ G02B 6/36
[52] U.S. Cl. ...................................................... 385/135
[58] Field of Search ......................................... 385/135

[56] References Cited

U.S. PATENT DOCUMENTS 4,802,724  2/1989  Fraize et al. ...................... 385/135
4,900,121  2/1990  Becker et al. ..................... 385/135

FOREIGN PATENT DOCUMENTS 3532314  3/1987  Fed. Rep. of Germany ...... 385/135
61-166502  7/1986  Japan ................................... 385/135

Primary Examiner—John D. Lee
Assistant Examiner—John Ngo
Attorney, Agent, or Firm—Terje Gudmestad; Wanda K. Denson-Low

[57] ABSTRACT

The excess length of optical fiber (31) in an optical fiber harness assembly (10) is accommodated by a doughnut-shaped accumulation chamber (17) in which the fiber (31) is coiled with one or more turns, the chamber being proportioned so that all of the excess length of fiber (31) may be accommodated when there is no tension on the conduit (13) of the harness (10), and when the conduit (13) is stretched under tension the fiber (31) will be bent to a radius no less than that at which the fiber will be damaged or the signal transmitted attenuated unduly.

9 Claims, 2 Drawing Sheets

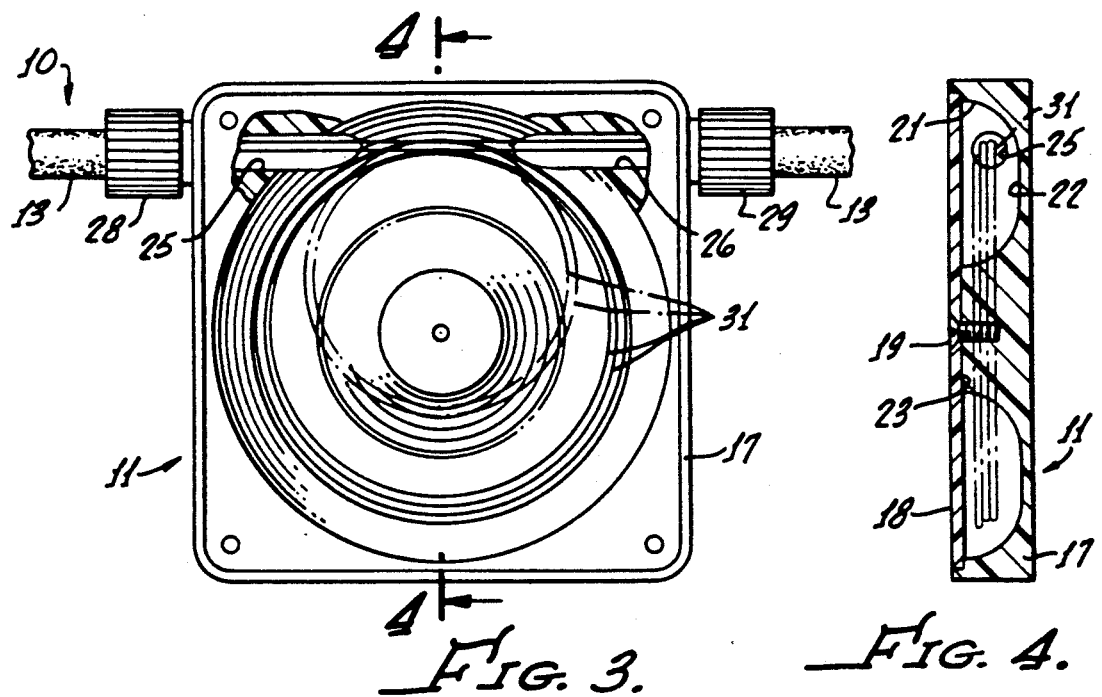
FIG. 3.   FIG. 4.
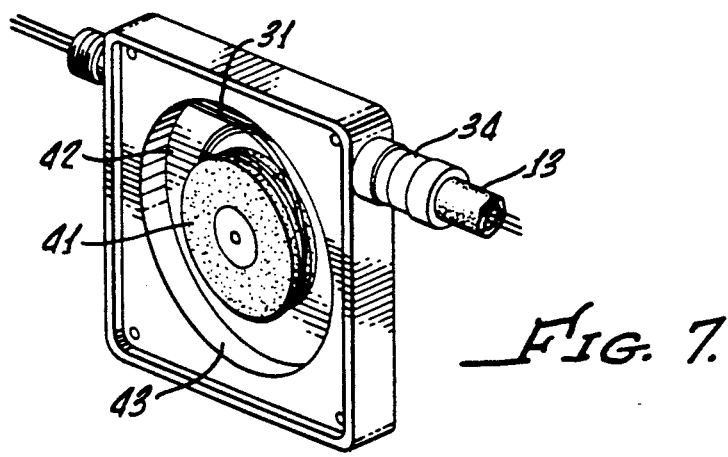
FIG. 7.
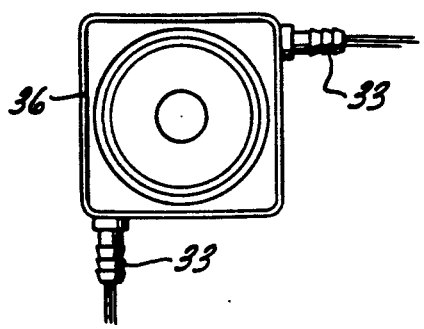   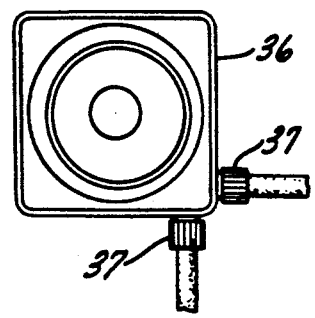
FIG. 5.   FIG. 6.

# ARRANGEMENT FOR ACCOMMODATING EXCESS LENGTH OF OPTICAL FIBERS

BACKGROUND OF THE INVENTION

1. Field of the Invention

This invention relates to the accommodation of excess optical fiber length in an optical fiber harness.

2. Description of Related Art

In optical fiber systems for controlling components of aircraft or automobiles, or for other types of equipment, it is desirable to group a number of optical fibers in a harness assembly. This offers advantages in production, installation and maintenance, as well as affording protection to the fibers under service conditions. However, in a harness system, the conduit that receives the optical fibers cannot be made the same length as that of the fibers. This is because the conduit will stretch under tension, which occurs during installation or at times of repair or maintenance. The optical fibers must be made at least as long as the dimension the conduit will assume when under a tensile load. However, when there is no tension on the conduit, as during normal service, the length of the conduit decreases meaning that there is an excess length of the optical fibers In the past these fibers simply have been pushed down inside the conduit in the hope that they will coil evenly in the process. However, this cannot be assured and in some instances the fibers can be caused to kink or to be bent to an excessively small radius. This can damage the fibers or cause excessive attenuation of the light signal transmitted by them. Hence, there has been an acute need for an arrangement to accommodate the excess length of optical fibers in an optical fiber harness system without damaging the fibers or creating unacceptable optical losses.

SUMMARY OF THE INVENTION

The present invention overcomes the difficulties of the prior art, assuring that excess length of optical fibers in a harness system will be accommodated and protected and never will be damaged by improper bending. The arrangement of this invention is economical to manufacture and use, and is reliable and maintenance free.

The arrangement of this invention includes a housing having a chamber inside having a shape which is an approximation of a toroid. Two spaced openings are provided in the housing to communicate with the chamber. A length of the optical fibers, without a conduit covering, is extended through the openings of the housing and around the core of the chamber, making one or more turns. Fittings are provided at the openings on the exterior of the housing. The conduit of the harness assembly can be connected to the housing at one of the openings. Connected to the other fitting can be either an extension of the conduit or a device in the system such as an optical fiber connector.

When there is no tension on the conduit of the harness, the chamber accommodates the entire length of the excess fiber, preferably spaced from the inside of the outer circumferential wall of the chamber. When the conduit is placed under tension, some of the length of the optical fibers is pulled from the chamber, thus causing the coil or coils of optical fiber within the chamber to achieve a smaller radius. The parts are proportioned so that this radius exceeds the minimum radius of bend permissible for the fiber. Preferably the fibers do not contact the inner circumferential surface of the chamber during the conditions when the conduit is under tension. In this manner the optical fibers have a controlled amount of bend which can assure that they are undamaged and the light signals through the fibers are not diminished significantly on account of the bending of the fibers. The fibers are fully protected within the housing which can be environmentally sealed. The accumulation chamber may be located wherever convenient in an optical fiber harness system.

An additional advantage of the invention is that the excess fiber available in the system may be used in attaching a fiber to a new terminus in the event of damage to the terminus to which it was attached originally. This involves cutting off the damaged terminus and attaching the shortened fiber to the new terminus. The chamber may accommodate an adequate length of fiber to make this possible without the necessity of making the entire assembly shorter or running a new fiber through the conduit.

In one embodiment, the central core of the chamber is made of resilient material and has a radius of curvature larger than that to which the fibers achieve when the conduit is under tension. In that event, the fibers engage and compress the core when the conduit is under tension, and the core expands to help draw the fibers back into the chamber when the conduit no longer is stretched.

BRIEF DESCRIPTION OF THE DRAWINGS

FIG. 3 is a side elevational view, partially broken away, of the fiber accumulation unit with the cover plate removed;

FIG. 4 is a transverse sectional view taken on line 4—4 of FIG. 3, but with the cover plate in place;

FIGS. 5 and 6 are elevational views of modified fiber accumulation units with the cover plates removed; and FIG. 7 is a perspective view of another embodiment of the fiber accumulation unit that utilizes a resilient foam core in the chamber.

DESCRIPTION OF THE PREFERRED EMBODIMENTS

Figure 1:
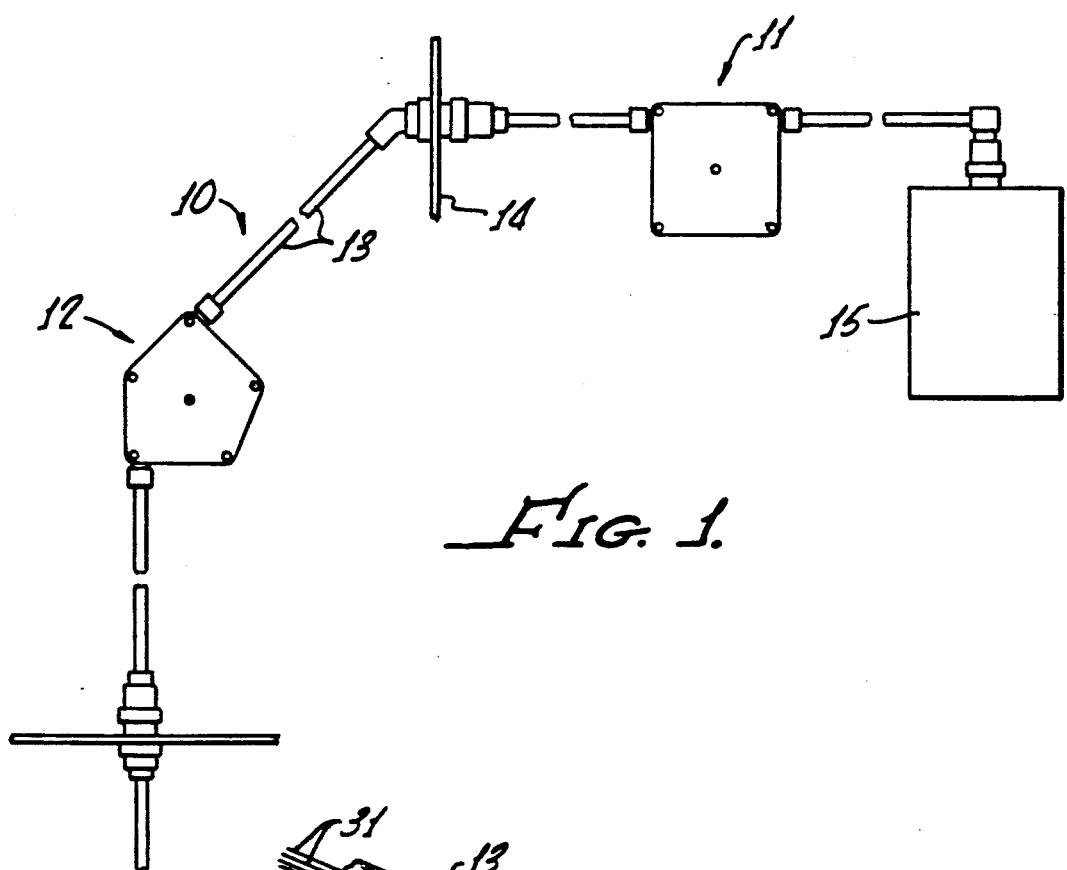
FIG. 1 is a view of an optical fiber system incorporating the fiber accumulation arrangement of this invention.

Illustrated in FIG. 1 is a typical optical fiber harness assembly 10 which incorporates fiber accumulation chambers 11 and 12 of this invention. In the system illustrated, the harness includes an outer conduit 13 within which is a multiplicity of optical fibers. The harness connects by means of various fittings through a firewall interface 14 to an electronic engine control 15.

Figure 2:
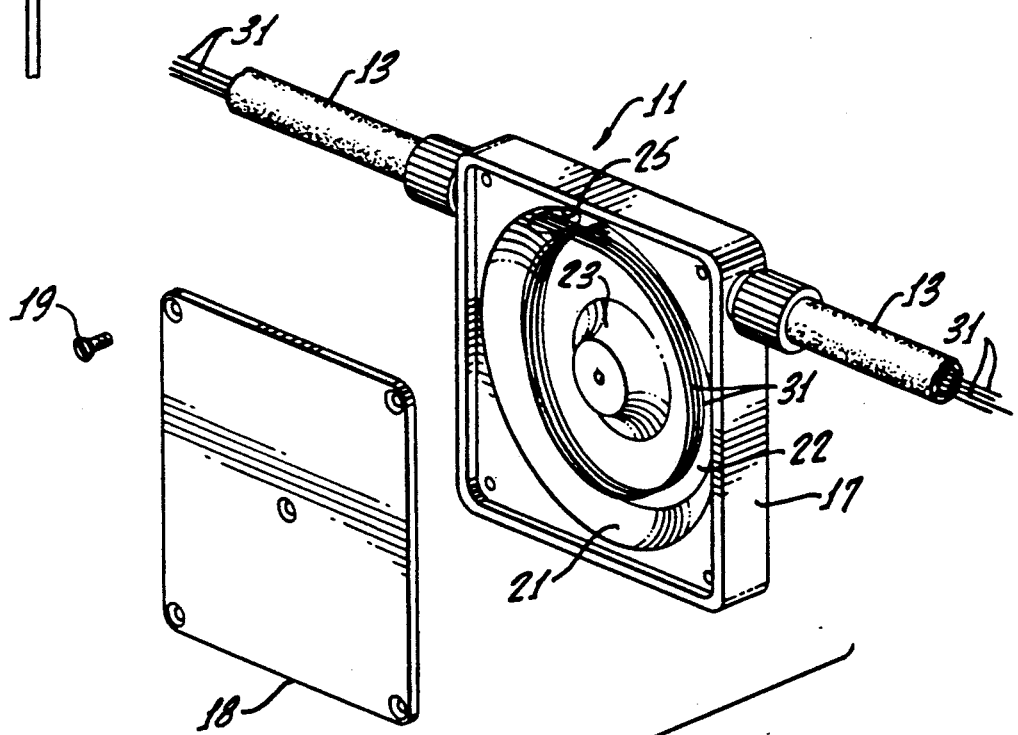
FIG. 2 is an enlarged fragmentary exploded perspective view of one of the optical fiber accumulation units.

The fiber accumulation chamber 11, illustrated in detail in FIGS. 2, 3 and 4, consists of a housing 17 which is generally square in elevation and relatively thin. A cover plate 18 is held by screws 19 to the housing 17 and a suitable gasket may be included to provide an environmental seal. Within the housing 17 is an arcuate outer circumferential wall 21 which connects through a sidewall 22 to an inner circumferential wall 23. The walls 21, 22 and 23, together with the cover plate 18, define a somewhat toroidal or doughnut-shaped chamber.

Near the top of the chamber, as the device is illustrated, two axially aligned passageways 25 and 26 extend from the exterior of the housing 17 to the chamber from opposite sides These passageways are generally tangential to the chamber within the housing so that the optical fibers 31 also are tangential relative to the chamber adjacent the openings 25 and 26. Suitable fittings 28 and 29 are provided on the exterior of the housing 17 at the openings 25 and 26 for connection to mating fittings on the conduit 13 of the harness 10.

The optical fibers 31 are made longer than the conduit 13 and the excess fiber length is extended through the passageways 25 and 26 and coiled within the chamber. The fibers 31 make one or more turns around the inner peripheral wall 23. Typically the fibers 31 will make from one to six turns within the chamber, depending upon the amount of excess fiber that is to be accommodated and the dimensions of the chamber.

The condition where the conduit 13 is not under tension is illustrated in FIGS. 2, 3 and 4 with the fibers 31 loosely coiled and spaced well away from the inner peripheral wall 23. Preferably the fibers 31 approach but do not reach the outer peripheral wall 21. If the conduit 13 is placed under tension, however, such as during installation or maintenance, the conduit 13 will stretch requiring additional amounts of the fibers 31 to be withdrawn from the chamber through either the opening 25 or 26, or through both. In that event the fibers 31 become coiled more tightly within the chamber. This condition is shown in phantom in FIG. 3. However, it is preferable that the chamber dimensions and the number of turns of the fibers 31 be selected such that the fibers remain spaced from the inner peripheral surface 23. The minimum radius at the surface 23 is selected to be the minimum bend radius permissible for the fibers 31 without damaging the fibers or causing undue light attenuation.

Therefore, the fiber length is selected such that it not only will allow for the stretch of the conduit 13, but also will permit the fibers to be coiled within the chamber to a radius no less than the minimum bend radius permissible for the fibers. The length of the fibers is equal to at least the length of the conduit 13 when stretched under tensile load, plus the amount to be coiled at no less than the minimum bend radius within the chamber Typically, up to six inches of extra fiber length must be accounted for. The permissible bend radius for aircraft-type optical fibers ranges from around $\frac{7}{8}$ inch to $1\frac{3}{8}$ inches, depending upon the manufacturer and the temperatures to which the fiber is to be subjected.

The accumulation chambers may be positioned in any convenient locations in the harness assembly. Any kind of fitting may be provided at the exterior of the housing for connection into the harness, including a hose barb fitting 33 as shown in FIG. 5. The accumulation chamber may connect directly to the back shell of an optical fiber connector 34, as seen in FIG. 7. However it is preferred not to incorporate the accumulation chamber within the connector because the extra weight involved at the back shell under vibration could tend to cause the fibers to work loose and degrade the connections of the fibers within the connector.

The fiber accumulation device 12 of FIG. 1 is similar to that of the device 11, being made, however, to provide connections at an obtuse angle, such as 135 degrees, rather than the axially aligned connections of the accumulation chamber 11. Other variations are possible, including those shown in FIGS. 5 and 6. In FIG. 5 the connections to the housing 36 at the fitting 33 are at a 90 degree angle and are positioned near opposite corners of the housing. The interior, including the accumulation chamber, is essentially the same as in the previously described embodiment In FIG. 6 the connections 37 to the housing 39 also are at right angles to each other, but both are adjacent the same corner of the housing Variations of this sort can result in maximum efficiency in the connections within the harness, facilitating the routing of the harness along a desired path.

In the embodiment of FIG. 7 a resilient foam core 41 is provided at the center of the chamber 42, spaced from the outer circumferential wall 43. In this arrangement the diameter of the core 41 is proportioned relative to the excess length of the fibers and the number of turns within the chamber so that the fibers will engage and compress the core 41 when the conduit 13 is stretched. The material of the core 41 is selected such that it can be deformed in this manner without causing damage to the fibers. Of course, the fibers will not be bent to less than the minimum bend radius when the conduit 13 is stretched under tensile load and the core 41 is compressed. When the load on the conduit is relaxed the resilience of the core 41 causes it to expand and assist in drawing the excess fiber back into the chamber 42.

It is possible to eliminate the inner peripheral wall altogether so that the accumulation chamber has no core at its center and instead provides an open chamber with only an outer peripheral wall. However, the inner core is preferred to assist in coiling the excess fiber within the chamber and also to assure that no one turn of the fiber can ever be given a bend radius less than that permissible for the fiber. The inner and outer peripheral walls of the chamber need not be circular, inasmuch as the fibers will not normally engage these walls. However, circular walls are preferred to approximate the shape of the fiber coil within the chamber.

What is claimed is:

1. The method of accommodating excess length of optical fibers of a type which are to be bent to no less than a predetermined radius, and which are in an optical fiber harness system in which a plurality of optical fibers are received within a conduit which has a first length when not under tensile load and can stretch to a second and greater length when under tensile load, comprising the steps of
    causing said fibers to have a length which is greater than said second length of said conduit so that there is a first excess length of said fibers outside said conduit when said conduit is of said first length, and a second excess length of said fibers outside said conduit when said conduit is of said second length, said first excess length being greater than said second excess length, said second excess length being made sufficient to allow said second excess length of fibers to be coiled at a radius no less than said predetermined radius when said conduit is of said second length,
    coiling said fibers outside of said conduit within a chamber which will accommodate said first excess length of fibers in a coil when said conduit is of said first length,
    causing said conduit to be of said first length,
    and applying a tensile load to said conduit so that said conduit achieves said second length, and said second excess length of fibers is coiled in said chamber to a radius no less than said predetermined radius.

2. The method as recited in claim 1 in which said chamber is made to a dimension such that the entire length of excess fibers can be received therein without touching the wall thereof.

3. The method as recited in claim 1 in which said chamber is made to have an inner core, said fibers are coiled around said core, and said conduit is dimensioned such that when said conduit is of said second length said coiled fibers have a radius of curvature which is greater than the dimension of said core.

4. The method as recited in claim 1 in which said chamber is made to be substantially toroidal in shape having an outer circumferential surface which has a greater radius of curvature than the radius of curvature of said coiled fibers when said conduit is of said first length, and having an inner circumferential surface which has a lesser radius of curvature than that of said coiled fibers when said conduit is of said second length.

5. The method as recited in claim 4 in which said inner circumferential surface is made to have a radius no less than said predetermined radius.

6. The method as recited in claim 1 including the step of attaching one end of said conduit to said chamber.

7. The method as recited in claim 1 including the steps of forming a passageway communicating with said chamber which is generally tangential to said chamber, and extending said fibers through said passageway into said chamber.

8. In combination with an optical fiber harness assembly which includes a stretchable conduit and a plurality of optical fibers in said conduit, said fibers having a minimum permissible bend radius and being longer than said conduit when said conduit is not under tensile load so as to result in an excess length of said fibers, a device for accommodating the excess length of said fibers comprising
    means defining a generally toroidal chamber having an inner circumferential surface and an outer circumferential surface
    means defining two spaced openings communicating with said chamber,
        said conduit being connected to at least one of said means defining an opening,
        said fibers extending through said openings into said chamber and making at least one turn between said openings around said inner circumferential surface of said chamber,
    the inner circumferential surface of said chamber having a radius no less than the minimum permissible bend radius of said fibers so as to permit excess length of fibers to be withdrawn from said chamber when said conduit is under tensile load without subjecting said fibers to less than said permissible bend radius,
    the outer circumferential surface of said chamber being coordinated with the number of turns of said fibers in said chamber to provide a space which will accommodate said excess length of fibers when said conduit is not under tensile load,
    said means defining a chamber including a resilient deformable portion at said inner circumferential surface, whereby said fibers can engage and deform said portion when said conduit is under tensile load, and said portion can expand to pull said excess length of fibers into said chamber when said conduit is not under tensile load.

9. The method of accommodating excess length of optical fibers of a type which are to be bent to no less than a predetermined radius, and which are in an optical fiber harness system in which a plurality of optical fibers are received within a conduit which is subject to conditions under which it is under tensile load and conditions where it is not under substantial tensile load, and which conduit will stretch under tensile load,
    causing said fibers to have a length which is greater than the length of said conduit when said conduit is under tensile load by an amount which leaves a length of said fibers outside of said conduit when said conduit is stretched under tensile load that allows said fibers outside of said conduit to be coiled at a radius no less than said predetermined radius,
    coiling the fibers outside of said conduit within a chamber which will accommodate the entire length of excess fibers when said conduit is not under tensile load,
    and positioning a deflectable resilient member in the central portion of said chamber which member has a dimension greater than the inner dimension of said coiled fibers when said conduit is under tensile load, whereby said member is engaged by said coiled fibers and is deflected when said conduit is under tensile load, and said member exerts a resilient force on said fibers for pulling said fibers into said chamber when said conduit is not under tensile load.

* * * * *